Sept. 30, 1941.      R. J. OLANDER      2,257,306
FRICTION SHOCK ABSORBING MECHANISM
Filed May 15, 1939        2 Sheets-Sheet 2
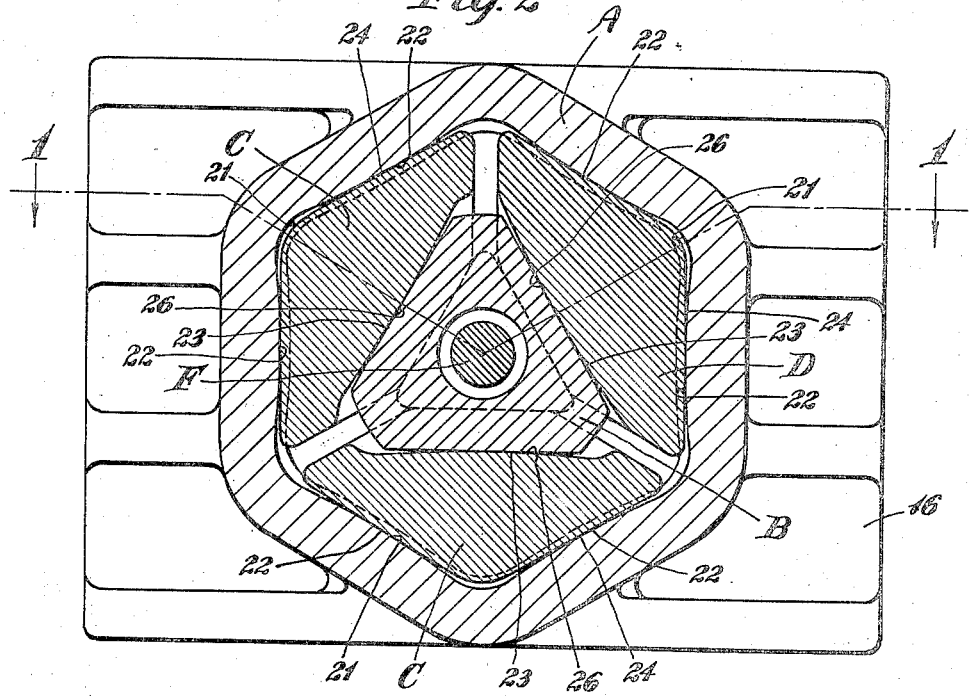
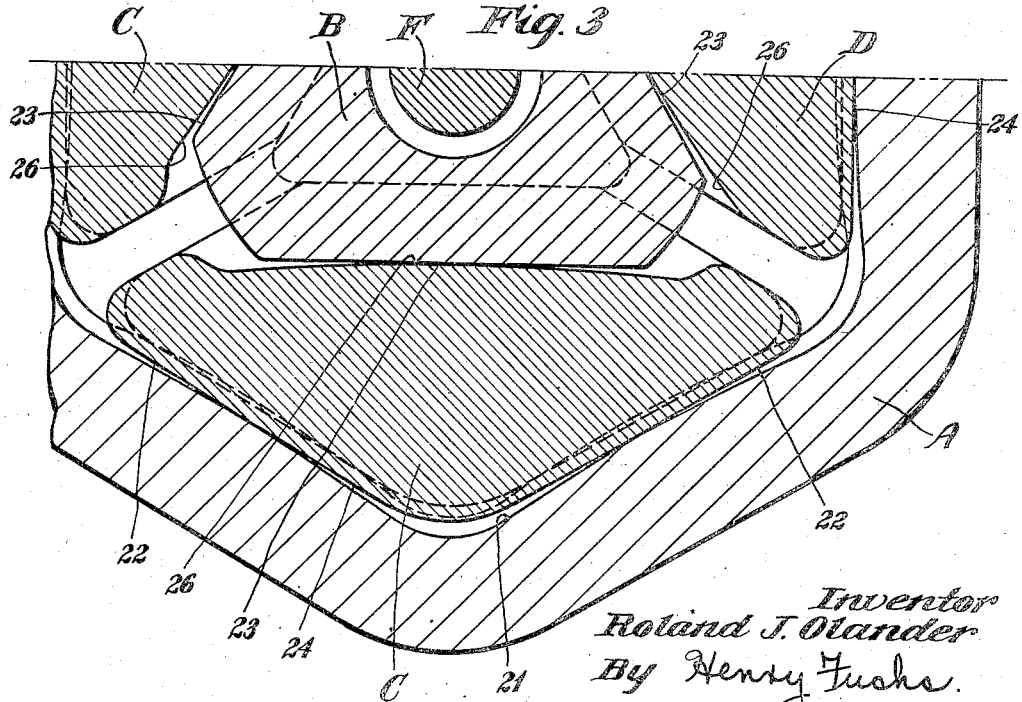
Inventor
Roland J. Olander
By Henry Fuchs.
Atty.

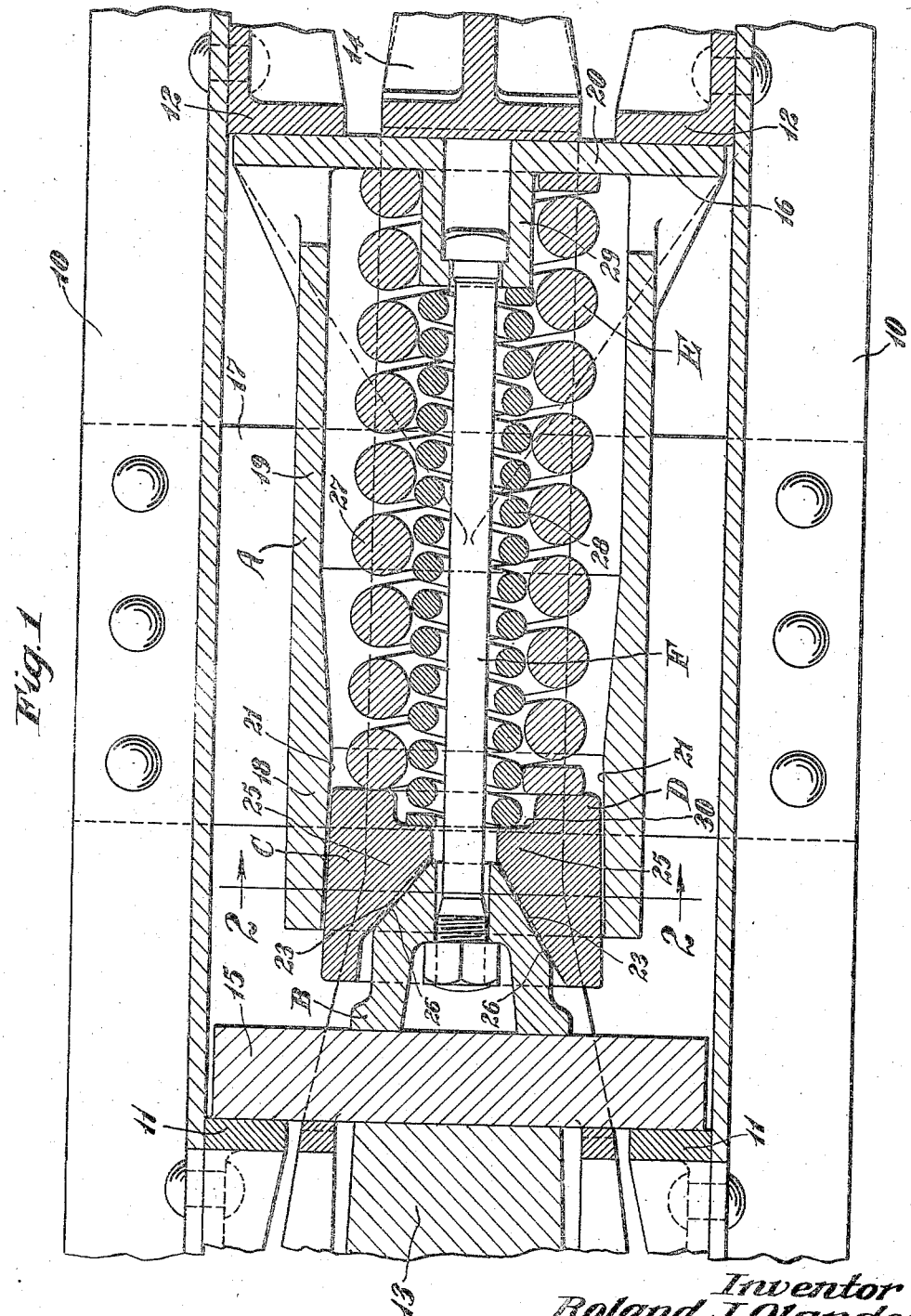

Patented Sept. 30, 1941

2,257,306

UNITED STATES PATENT OFFICE 2,257,306

FRICTION SHOCK ABSORBING MECHANISM

Roland J. Olander, Chicago, Ill., assignor to W. H. Miner, Inc., Chicago, Ill., a corporation of Delaware Application May 15, 1939, Serial No. 273,603

8 Claims. (Cl. 213—32)

This invention relates to improvements in friction shock absorbing mechanisms for railway draft riggings, and more particularly to such mechanisms wherein are employed a wedge friction system including wedge means and a plurality of friction shoes coacting with a friction casing.

As is well known to those skilled in the art accurate fitting of the cooperating elements of a friction shock absorbing mechanism is essential to obtain high capacity together with efficient operation demanded by modern railway practice. Inasmuch as the friction casings employed in such shock absorbing mechanisms are made in the form of castings, certain slight inaccuracies occur in the contour of such casings due to unavoidable foundry variations, affecting trueness of the friction shell sections thereof. Such unavoidable foundry variations must be permitted in commercial practice and thus there is a lack of uniformity in casings produced. The inaccuracies in the friction shell section of the casing, if not taken care of, obviously, will seriously affect the operation of the shock absorber. In friction casings having tapering friction shell sections composed of friction surfaces symmetrically disposed about the longitudinal axis of the casing, these inaccuracies include variations in the degree of inclination of the several friction surfaces with respect to the longitudinal axis of the casing and variations in the location of the friction surfaces with respect to each other.

It has for some time been the practice in this art to longitudinally crown the wedge faces of the shoes to compensate for the inaccuracies involving relative inclination of these surfaces with respect to the longitudinal central axis of the casing, thus automatically permitting of adjustment of the parts of the friction clutch to accommodate themselves to each individual casing, as disclosed in Johnson Patent No. 1,730,214. Those unavoidable irregularities hereinbefore referred to involving the relative locations of the friction surfaces with respect to each other, that is, the irregularities which are due to non-uniformity in transverse cross sectional contour of casings, also have a decided influence on the proper operation of the mechanism in that the interior cross sectional contour of the friction shell of the mechanism does not conform to the contour of the friction clutch. This is especially true in connection with friction casings of angular interior cross section in which variations may occur in angularity between adjacent interior walls which provide the friction surfaces of the mechanism.

One object of the invention is to provide in a friction shock absorbing mechanism including a friction casing and a friction clutch slidable within said casing, a simple expedient for obtaining proper fitting of the clutch within individual casings regardless of unavoidable irregularities in transverse interior cross sectional contour of said casings.

A more specific object of the invention is to provide a friction shock absorbing mechanism comprising a hexagonal friction casing and a spring resisted friction clutch including a central wedge block and friction shoes surrounding said block, the shoes being in wedging contact with the block and having V-shaped friction surfaces cooperating with the V-shaped friction surfaces formed by adjacent wall members of the casing, wherein the wedging contact between the wedge block and each shoe is on cooperating sets of wedge faces, one of which is initially transversely crowned to provide for automatic adjustment of the shoe on the wedge to align the V-shaped friction surface of the shoe with the corresponding V-shaped friction surface of the casing, wherein the diverging face portions of the V-shaped friction surfaces of said shoe or of the V-shaped friction surface of the casing are initially transversely crowned to provide for proper fitting of said V-shaped surfaces to each other, and wherein said crowned wedge faces and crowned faces are adapted to be flattened out under pressure to produce substantially true flat face contact between the wedge and shoes and between the shoes and friction shell, thereby compensating for unavoidable variations which may occur in the casing contour due to permissible foundry variations occurring in commercial practice.

Other objects of the invention will more clearly appear from the description and claims hereinafter following.

In the drawings forming a part of this specification, Figure 1 is a horizontal longitudinal, sectional view of a portion of a railway draft rigging illustrating my improvements in connection therewith, the section through the casing and friction elements therewithin corresponding to two section planes 120° apart, as indicated by the line 1—1 in Figure 2. Figure 2 is a transverse, vertical, sectional view, on an enlarged scale, corresponding substantially to the line 2—2 of Figure 1. Figure 3 is a view of the lower half of the friction shell and friction elements associated therewith as shown in Figure 2, on a still larger scale.

In said drawings, 10—10 denote the usual draft or center sills of a car underframe structure, said sills being preferably of channel cross section and to the inner faces of which are secured the usual front and rear stop lugs 11—11 and 12—12. The inner end portion of the drawbar is indicated at 13, the same being operatively connected to a hooded yoke 14 of well-known form and within which is disposed the shock absorbing mechanism proper hereinafter described and a front follower 15.

My improved shock absorbing mechanism proper, as shown, comprises broadly a hexagonal friction casing A having interior friction surfaces which are slightly crowned; a pressure transmitting wedge B; three friction shoes C—C and D; a spring resistance E; and a retainer bolt F.

The casing A is of hexagonal exterior cross section and has a rear follower 16 formed integral therewith. The casing is supported within the yoke and the yoke, in turn, is supported by a detachable saddle plate 17 fixed to the draft sills.

The casing A has the friction shell portion proper 18 formed at the open front end thereof. Rearwardly of the friction shell section, the casing A provides a spring cage portion 19. The casing is closed at the rear end by a transverse vertical wall 20 which extends laterally outwardly at opposite sides of the casing, thus providing flanges which form the follower section 16 cooperating with the rear stop lugs 12—12 in the manner of the usual rear follower. As shown clearly in Figures 1 and 2, the walls of the friction shell portion 18 of the casing are relatively thickened with respect to the rear sections of said wall. The friction shell section 18 of the casing is of hexagonal interior cross section and presents three interior friction surfaces 21—21—21 which are of V-shaped cross section, extend lengthwise of the casing, each friction surface 21 presenting laterally diverging faces 22—22. The friction surfaces 21—21—21 converge inwardly and rearwardly toward the central longitudinal axis of said casing. As will be evident, the converged friction surfaces 21—21—21 provide a friction shell portion which is tapered slightly toward the rear of the mechanism. Each friction face 22 is crowned transversely to provide a convexity of relatively small curvature for a purpose hereinafter described.

The wedge B through which the pressure is transmitted, is in the form of a hollow block having a front transverse bearing face engaging the front follower 15. At its rear end, the wedge B is provided with three rearwardly converging, flat wedge faces 23—23—23 disposed around the center or axis of the wedge and giving the wedge the appearance of a truncated triangular pyramid.

The three friction shoes C—C and D are preferably in the form of drop-forgings and are of like construction, except as hereinafter pointed out, each having an outer V-shaped friction surface 24, the sections of which present flat faces disposed at an angle of 120° with respect to each other and adapted to engage with the corresponding faces 22—22 of the cooperating V-shaped friction surface 21 of the casing A, and correspondingly inclined thereto. On the inner side, that is, the side nearest the axis of the casing A, each shoe is provided with a lateral enlargement 25 on the front side of which is provided a rearwardly and inwardly inclined, transversely and longitudinally convex or crowned face 26 cooperating with one of the inclined faces 23 of the wedge block B. As shown clearly in Figures 1, 2, and 3, the faces 26 of the shoes C—C and D are only slightly crowned or convex, being curved on arcs of relatively great radius in said longitudinal and transverse directions, for a purpose hereinafter described.

As will be evident in the assembled shock absorbing mechanism, the V-shaped friction surfaces of the shoes C—C and D will contact with the curve of the rounded or crowned faces 22—22 of the V-shaped friction surfaces 21 of the casing, and as the mechanism is compressed a few times the rounded faces of the casing will be rapidly flattened out due to the enormous pressure to which the gear is subjected, thereby producing true surface contact between the friction surfaces of the shoes and casing. In a hexagonal casing which is accurately formed and thus has interior angles of 120°, as shown in Figures 2 and 3, this contact will be at the high point or midway between the ends of the curve of the rounded or crowned faces of the casing. In casings which are not absolutely true due to permissible foundry practice slight variations in the angle between the adjacent faces 22—22 of the various friction surfaces 21 will occur, that is, the angle will be either more or less than 120°. Assuming that the angle between the faces 22—22 of any one of said V-shaped friction surfaces 21 of the casing is greater than 120°, the V-shaped friction portion of the shoe will seat more deeply in the V-shaped friction surface of the casing and contact of the flat shoe faces with the rounded faces 22—22 will be had near the inner ends of the curves of said faces, that is, near the ends which are at the apex of the V. Assuming that the angle between the faces 22—22 of any one of said V-shaped surfaces of the casing is less than 120°, the V-shaped friction portion of the shoe will not pass as deeply into the V of the friction surface of the casing and contact of the flat shoe faces with the rounded faces 22—22 will be had near the outer ends of the curves of said faces, that is, the ends remote from the apex of the V. As will be evident, the flat friction face portions of the V-shaped surfaces of the friction shoes will always bear on the rounded portions of the friction faces of the casing regardless of slight variations in the angle between adjacent faces of the V-shaped friction surfaces of the casing, so that the curvature of these faces may be flattened out in the manner hereinbefore described to produce true surface contact. The curvature of the faces 22—22 of the casing is made relatively slight to facilitate flattening of the same under pressure, but great enough to assure contact of the rounded portions thereof with the flat faces of the shoes regardless of variations in angularity of the interior friction faces of a hexagonal casing which come within the commercial limits permitted in foundry practice. As will be evident from the foregoing description, the rounding or crowning of the faces 22—22 of the casing facilitates proper fitting of the shoes to the casing with the result that ultimate flat contact between the friction surfaces of the shoes and casing is obtained regardless of permissible variations in cross sectional contour of the casing.

In the present disclosure, my improvements are shown as embodied in a friction shock absorbing mechanism of the blunt and keen angle type, that is, of the character illustrated in O'Connor Patent No. 1,497,935, June 17, 1924, wherein the wedge has true or keen wedging engagement with one shoe and blunt wedging engagement with the remaining two shoes. However, my invention is not limited to a mechanism of this type and is equally well adapted to mechanisms wherein the angles of wedging engagement between the wedge and the friction shoes are all equal, that is, wherein the wedge has wedging engagement at the same angle with each shoe. As shown in the drawings, the shoes C and C have blunt wedging engagement with the wedge B, and the shoe D has keen angle wedging engagement with said wedge.

The spring resistance E, as shown, comprises an outer heavy coil 27 bearing at its inner end against the wall 20 of the casing A and an inner relatively lighter coil 28 bearing at its inner end on a hollow cuplike boss 29 formed integral with the end wall 20. At its forward end, the outer coil 27 of the spring bears directly on the inner ends of the shoes C—C and D. The inner coil 28 of the spring extends forwardly beyond the coil 27 and bears on the transverse shoulders 30—30—30 formed by the enlargements 25—25—25 of the shoes C—C and D.

The retainer bolt F is anchored at its rear end within the boss 29 and at its forward end within a suitable recess provided within the wedge B, the latter being apertured to accommodate the shank of the bolt. The bolt F not only serves to maintain the parts assembled but is also utilized to adjust the parts to proper overall length to maintain them in this position when under full release, and to place the spring under initial compression to compensate for wear.

In connection with my improved shock absorbing mechanism, assuming a compression action due to either a buffing or draft action of the drawbar, the general operation of the mechanism is as follows, detailed consideration of the cooperating convex or crowned and flat inclined faces of the shoes and wedge being omitted at this time: As the wedge B is forced inwardly of the casing, the shoes C—C and D will be forced rearwardly therewith against the resistance of the spring E and spread apart due to the wedging action between the cooperating wedge faces of the wedge B and the shoes, thereby forcing the shoes into intimate frictional contact with the friction surfaces of the casing A. High frictional resistance is thus produced between the casing A and the shoes C—C and D as they are forced inwardly of the latter, thereby effecting cushioning of the shocks to which the mechanism is subjected. Due to the inward taper of the friction shell section 18 of the casing A, a differential action will be set up between the shoes C—C and D and the wedge B, during compression of the mechanism, the shoes being advanced inwardly of the casing at a greater rate than the wedge, thereby augmenting the resistance to shocks offered by the mechanism.

Upon reduction of the actuating or compression force, the expansive action of the spring E effects release of the parts by forcing the shoes C—C and D and wedge B outwardly until further outward movement of the wedge is limited by the bolt F. The three shoes will be forced outwardly to their normal position limited by the wedge B as clearly shown in Figure 1.

Referring now more specifically to the operation of the convexed or crowned surfaces of the shoes C—C and D: In commercial practice a variation of two degrees in the taper of the casing friction surfaces in a device of the kind disclosed is permitted. In carrying out my invention, the radius of curvature lengthwise of the mechanism of each convex face 26 of the shoes is made relatively long and of such a length that it will accommodate variations within the two degrees hereinbefore referred to, that is, assuming the maximum variation in one direction, contact will be insured between the curved surface 26 and the flat surface 23 of the wedge near the inner ends thereof; assuming the limit of variation in the opposite direction, contact will be assured between the curved surface 26 and the surface 23 near their outer ends; a casing formed with the friction surfaces tapered accurately as designed will insure contact at the center of the curved surface 26 and the surface 23; and variations intermediate the points referred to will insure contact between the extreme limits mentioned.

The curvature in transverse direction of the convex or crowned surface 26 of each shoe is such that it will accommodate variations in the hexagonal contour of the casing, that is, that the shoe will register with the corresponding V-shaped friction surfaces of the casing when the casing is slightly distorted and the entire V-shaped surface displaced or askew with respect to what its position would be in a truly hexagonal casing as designed having all its sides and angles equal. Any such inequality which results from the V-shaped friction surfaces of the casing being askew is compensated for by transverse rocking of the curved face 26 of the shoe on the cooperating wedge face 23 of the wedge block B. The transverse curvature of the face 26 is preferably made relatively slight to facilitate rapid flattening of the same under pressure and still give the maximum limit of adjustment required.

When the parts are assembled, there will be, theoretically only, a point contact between each set of surfaces 23 and 26, but as soon as the device is compressed once this theoretical point contact will immediately be widened into a surface contact of appreciable area, and as two or three or four additional compressions of the mechanism occur, the area of contact is correspondingly increased until a sufficiently large enough area is obtained to insure the proper functioning of the device.

This process of fitting the parts to compensate for permissible foundry variations can obviously be accomplished in the usual test of the gear before being shipped and applied to the car.

From the foregoing it will be observed that my improvements permit of automatic compensation of the parts even though the inclination of one friction surface 21 may differ from the inclination found in any other friction surface 21 and though the casing may be distorted from true regular hexagonal shape in cross section. It will also be evident that no increase in cost of manufacture of any of the parts as compared with a device of similar type is involved, and the parts will automatically adjust themselves and produce the desired results hereinbefore indicated.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with a friction casing of angular interior cross section having a plurality of longitudinally extending, pairs of adjacent laterally diverging friction surfaces, each surface being slightly crowned transversely and adapted to be flattened under pressure; of friction shoes, each having a pair of laterally outwardly diverging flat surfaces engaging one of said pairs of crowned surfaces; a wedge pressure transmitting member having wedging engagement with said shoes to press the same outwardly against and slide the same along said crowned friction surfaces of the casing to flatten said crowned surfaces during actuation of the mechanism; and means within the casing yieldingly opposing movement of said shoes inwardly of the casing.

2. In a friction shock absorbing mechanism, the combination with a column member having longitudinally extending friction surfaces of V-shaped cross section, the diverging face portions of said V-shaped surfaces being slightly crowned in the direction of their divergence to be flattened under pressure; of a plurality of friction shoes having V-shaped friction surfaces having substantially flat face portions engaged with the V-shaped surfaces of the column member in bearing contact with the curve thereof to compensate for unavoidable variations in relative angularity of the sections of the V-shaped column surfaces and assure contact of said flat face portions therewith at zones between the end edges of said flat face portions; wedge means receiving the actuating force and having wedging engagement with said shoes for forcing the same lengthwise of the casing and against the friction surfaces of said column member with heavy pressure to flatten said column surfaces during actuations of the mechanism; and means yieldingly opposing movement of said shoes lengthwise of the casing.

3. In a friction shock absorbing mechanism, the combination with a column member having a longitudinally extending friction surface of V-shaped transverse cross section; of a friction shoe having a V-shaped friction surface engaged with the V-shaped surface of the column member, each of the diverging face portions of one of said V-shaped surfaces being slightly crowned in the direction of divergence of said face portions to allow adjustment of said shoe to compensate for unavoidable variations in angularity, with respect to each other, of the sections of the V-shaped surface of the column member; wedge means engaging said shoe to move the same lengthwise of the column member and force it laterally against the column member to compress and flatten out said crowned surfaces during actuations of the mechanism; and means yieldingly opposing relative movement of the shoe and column member.

4. In a friction shock absorbing mechanism, the combination with a friction casing; of a spring resistance; friction shoes slidable within the casing, said shoes and casing having cooperating sets of engaging V-shaped friction surfaces, the diverging face portions of one of said V-shaped surfaces of each set being slightly crowned in the direction of divergence of said face portions thereof to compensate for unavoidable variations in angularity of divergence of the sections of the V-shaped surfaces of one set with respect to the other and assure contact between the engaging face sections at zones between the lateral ends thereof; and a wedge block through which the pressure is transmitted, said block and shoes having cooperating sets of engaging wedge faces for forcing said shoes inwardly of the casing and pressing the same against the friction surfaces of the casing to flatten said crowned surfaces during actuation of the mechanism, one of said wedge faces of each set being slightly crowned crosswise to permit rocking adjustment of the shoes on the wedge, said wedge face being flattened under pressure exerted between the wedge and shoes during actuations of the mechanism.

5. In a friction shock absorbing mechanism, the combination with a friction casing having interior, longitudinally extending, inwardly converging friction surfaces of V-shaped cross section; of friction shoes having V-shaped surfaces cooperable with said casing surfaces, the diverging face portions of said V-shaped surfaces of the casing being slightly crowned in crosswise direction to compensate for unavoidable variations in angularity of divergence of the sections of the V-shaped surfaces of the casing with respect to the angularity of divergence of the V-shaped surfaces of the shoes and assure contact between the surface sections of the V-shaped surfaces of said shoes and casing at zones between the side ends of said surface sections; and a wedge block through which the pressure is transmitted to said shoes, said wedge block and shoes having cooperating sets of engaging wedge faces, one of said faces of each set being convexly curved in a direction transversely of the casing, the curvature of said face being relatively slight, whereby, when the parts are initially assembled, contact of relatively minute area is had between said faces and between said surfaces of the shoes and casing, said curved faces and surfaces being flattened out automatically upon actuations of the mechanism to thereby increase the area of contact of said faces and said surfaces and produce true contact respectively therebetween.

6. The herein described process of insuring the accurate fitting of the parts of a friction shock absorbing mechanism, including the following steps: forming a friction casing with the interior friction surfaces of V-shaped, transverse cross section, and providing the diverging face portions of each of said friction surfaces with a crosswise crown; forming friction shoe elements with V-shaped friction surfaces adapted to cooperate therewith and providing each shoe with a crowned wedge face curved both longitudinally and transversely; forming a wedge element having wedge faces adapted to engage the crowned faces of the shoes; assembling said casing, wedge element, and shoe elements with the remaining parts of the mechanism and with the V-shaped shoe surfaces engaged with the crowned V-shaped surfaces of the casing and the crowned portion wedge face in contact with the wedge element; and then compressing the mechanism a number of times to flatten out said crowned friction surfaces and wedge faces to provide wider area of contact with the casing and wedge element.

7. The herein described process of insuring the accurate fitting of the parts of a friction shock absorbing mechanism, wherein the parts include a friction casing of angular, transverse, interior cross section and a spring resisted friction clutch including a wedge pressure transmitting member and friction shoes surrounding said wedge member, the wedge and each shoe having an opposed set of engaging wedge faces and the casing and each shoe having an opposed set of engaging V-shaped friction surfaces including the following steps: providing the diverging face portions of one of said opposed V-shaped friction surfaces with a slight transverse crown before assembling the mechanism to assure contact of the diverging face portions of the shoes with the diverging face portions of the casing at a zone between the ends of said engaging surface portions regardless of slight differences of angularity between the diverging face portions of the casing, and the diverging face portions of the cooperating shoe; then assembling the parts of the mechanism with the wedge faces of the wedge member engaged with the wedge faces of the shoes and the V-shaped friction surfaces of the shoes engaged with the friction surfaces of the casing; and then compressing the mechanism a number of times to flatten out said crowned friction surfaces to provide wider area of contact of said shoes with said casing.

8. In a friction shock absorbing mechanism, the combination with a friction casing having interior friction surfaces of V-shaped, transverse cross section, the diverging surface sections of said V-shaped surfaces being slightly convexly curved in the direction of their divergence; of a friction shoe cooperating with each V-shaped surface of said casing, said shoe having each face section of the V-shaped surface thereof substantially flat, said flat surfaces being in bearing contact with the convexly curved sections of said V-shaped friction surfaces of the casing, thereby providing for adjustment of said shoe with respect to said V-shaped casing surface to compensate for unavoidable slight variations in angularity of the surface sections of the V-shaped surfaces of the casing with respect to each other; a wedge block in wedging engagement with said shoes for forcing the same inwardly of the mechanism and outwardly against said casing surfaces to flatten said convex surfaces during actuation of the mechanism; and spring means yieldingly opposing movement of said shoes inwardly of the casing.

ROLAND J. OLANDER.